(12) United States Patent
Meggiolan

(10) Patent No.: US 6,568,767 B2
(45) Date of Patent: May 27, 2003

(54) WHEEL HUB FOR BICYCLE

(75) Inventor: Mario Meggiolan, Vicenza (IT)

(73) Assignee: Campagnolo Srl (IT)

( * ) Notice: Subject to any disclaimer, the term of this patent is extended or adjusted under 35 U.S.C. 154(b) by 0 days.

(21) Appl. No.: 09/973,041

(22) Filed: Oct. 10, 2001

(65) Prior Publication Data

US 2002/0043873 A1 Apr. 18, 2002

(30) Foreign Application Priority Data

Oct. 12, 2000 (IT) ........................... TO20A0955

(51) Int. Cl.$^7$ .............................. B60B 27/00; B60B 1/00
(52) U.S. Cl. ..................... 301/110.5; 301/104; 301/80
(58) Field of Search .................. 301/105.1, 110.5, 301/110.6, 80, 81, 82, 83, 74, 75

(56) References Cited

U.S. PATENT DOCUMENTS

| | | | |
|---|---|---|---|
| 3,865,220 A | | 2/1975 | Thompson, Jr. |
| 4,300,804 A | * | 11/1981 | Hasebe ................ 301/110.5 |
| 4,622,731 A | * | 11/1986 | Kjell ......................... 264/273 |
| 5,561,591 A | | 10/1996 | Mercat et al. |
| 5,829,844 A | * | 11/1998 | Slankard et al. ......... 301/110.5 |
| 6,018,869 A | * | 2/2000 | Slankard et al. ........ 29/894.361 |
| 6,409,282 B1 | * | 6/2002 | Nakajima et al. ......... 301/110.5 |
| 6,431,658 B1 | * | 8/2002 | Nakajima et al. ......... 301/110.5 |

FOREIGN PATENT DOCUMENTS

| | | |
|---|---|---|
| DE | 196 21 122 A1 | 11/1996 |
| EP | 0 764 551 A1 | 3/1997 |
| EP | 0 860 301 A1 | 8/1998 |
| FR | 2 524 395 | 10/1983 |

* cited by examiner

*Primary Examiner*—S. Joseph Morano
*Assistant Examiner*—Long Nguyen
(74) *Attorney, Agent, or Firm*—Volpe and Koenig, P.C.

(57) ABSTRACT

A wheel hub with a tubular body having at its ends a pair of flanges, each of which is provided with a plurality of holes for anchorage of L-shaped portions of respective spokes. At least one of the flanges is made of fiber-reinforced plastic material, and the holes of the aforesaid flange are associated to respective bushings made of metal material, which, in use, are set between the L-shaped portion of each spoke and the inner wall of the respective hole.

27 Claims, 2 Drawing Sheets

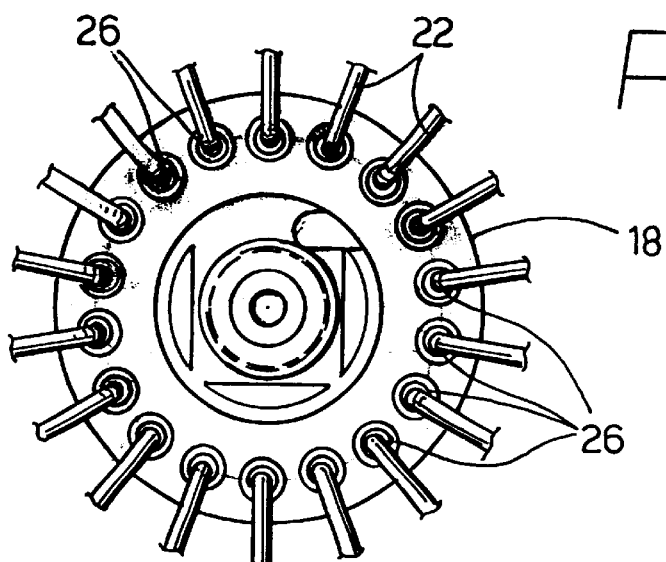
Fig_1
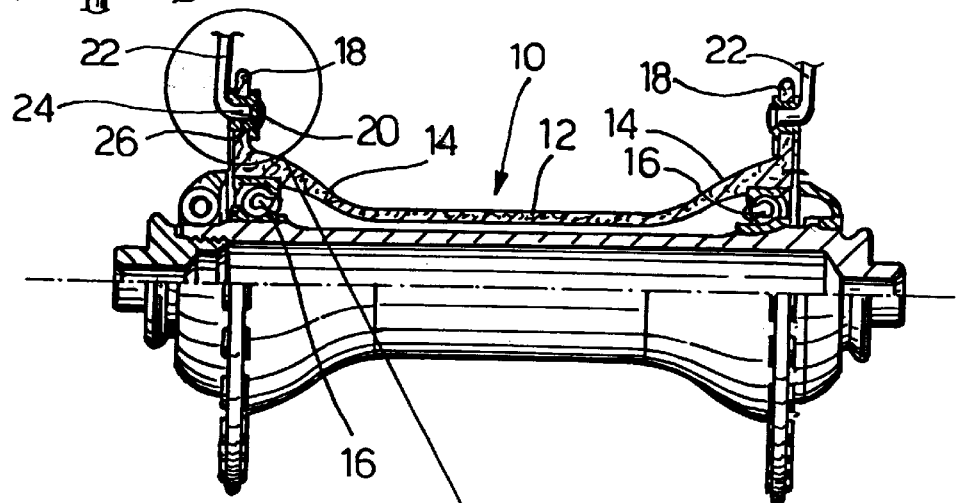
Fig_2
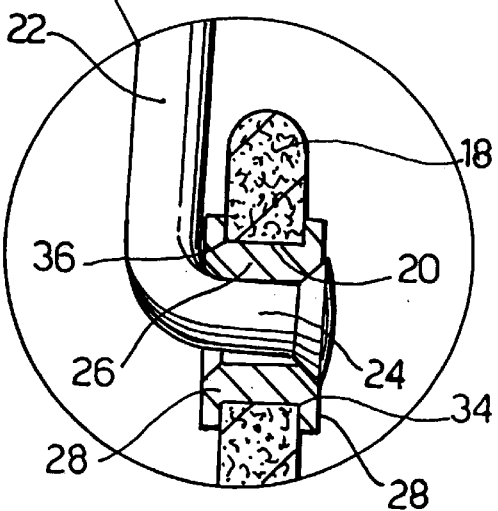
Fig_3

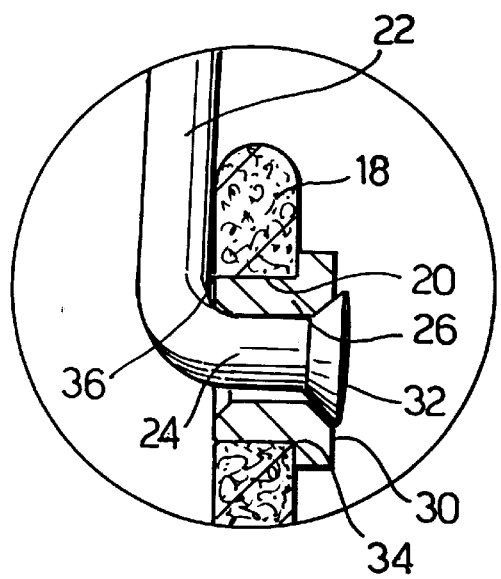
Fig_4
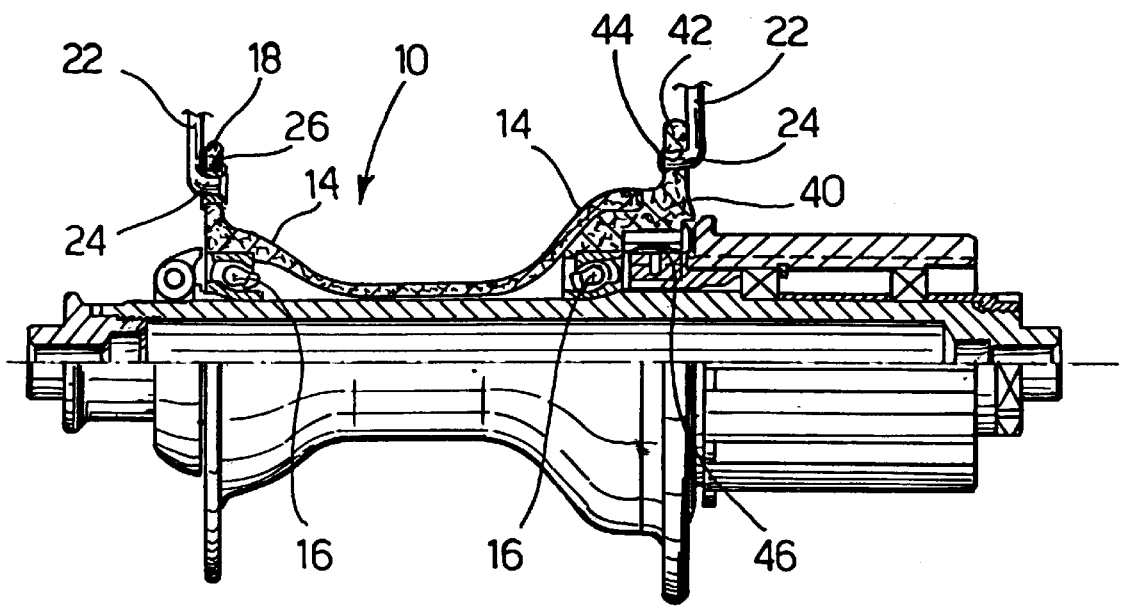
Fig_5

WHEEL HUB FOR BICYCLE

BACKGROUND OF THE INVENTION

The present invention relates to a wheel hub for a bicycle, in particular a racing bicycle.

The main target of manufacturers of components for racing bicycles is to reduce the weight of the individual components as much as possible. In the case of wheel hubs, the conventional technology envisages the use of light metal alloys, such aluminium alloys and the like. In order to reduce the weight of wheel hubs, solutions have already been proposed in which a tubular central part of the wheel hub is made of carbon fibres embedded in a resin of plastic material and in which a pair of side shells made of aluminium alloy are driven on the ends of the central portion made of carbon fibres. The side shells are provided with seats for supporting rolling bearings and for anchorage of the wheel spokes. Forming side shells made of carbon fibres in an integral way with the central portion would enable a further weight reduction but would entail serious problems as regards the way in which the spokes are anchored, above all in the case of spokes with L-shaped anchorage portions. If spokes of this sort were connected inside holes formed in a flange made of carbon fibres or the like, the stresses produced by tensioning of the spokes would give rise to contact pressures on the walls of the holes so high as to damage the hub in an irreparable way.

SUMMARY OF THE INVENTION

The purpose of the present invention is to provide a wheel hub that may overcome the aforesaid drawbacks.

According to the present invention, the above purpose is achieved by a wheel hub comprising a tubular body having at its ends a pair of flanges, each of which is provided with a plurality of holes for anchorage of respective spokes, in which at least one flange is made of fibre-reinforced plastic material and the aforesaid holes are associated to respective bushings made of metal material, each of which, in use, is set between an anchoring portion of a spoke and the inner wall of the respective hole.

BRIEF DESCRIPTION OF THE DRAWINGS

Further characteristics and advantages of the present invention will emerge clearly from the ensuing detailed description, provided purely by way of non-limiting example, in which:

FIG. 1 is a partially sectioned front view of a hub according to the present invention;

FIG. 2 is a partially sectioned side view of the hub of FIG. 1;

FIG. 3 is a detail, at a larger scale, of the part marked with a circle in FIG. 2;

FIG. 4 is a variant of FIG. 3; and

FIG. 5 is a partially sectioned front view of a variant of a hub according to the invention.

DETAILED DESCRIPTION OF THE INVENTION

In FIGS. 1 and 2, the reference number 10 designates a hub for a bicycle wheel. The hub 10 consists of a monolithic body made of fibre-reinforced plastic material. Preferably, the hub 10 is made of a carbon-fibre fabric embedded in a thermosetting resin.

The monolithic body forming the hub 10 comprises a tubular central portion 12, a pair of side shells 14 provided with seats for bearings 16, and a pair of end radial flanges 18.

Each of the radial flanges 18 is provided with a plurality of holes 20 with axes substantially parallel to the longitudinal axis of the hub 10, the said holes being designed to enable anchoring of spokes 22 having L-shaped attachment portions 24.

As illustrated in greater detail in FIGS. 3 and 4, each hole 20 is associated to a bushing 26 made of metal material, preferably steel. Each bushing 26 has an outer cylindrical wall which is in contact with the inner wall of the respective hole 20.

In the embodiment illustrated in FIG. 3, each bushing 26 has two edges 28 which rest against the opposite radial walls of the respective flange 18. At least one of the edges 28 of each bushing 26 is obtained by plastic deformation (pressing) after insertion of the bushing into the respective hole 20.

In the variant of FIG. 4, each bushing 26 has only one edge 30, situated in a position corresponding to the head 32 of the respective spoke 22.

If the bushings 26 were not present, the spokes would produce, on the edges designated by 34 and 36, a very high pressure, higher than the breaking load of the material constituting the hub. The bushings 26 distribute the forces due to the tensioning of the spokes over more extensive contact surfaces, thus reducing the pressure on the walls of the holes. In particular, the bushings 26 avoid a pressure concentration on the edges 34 and 36.

FIG. 5 illustrates a variant of a hub for a rear wheel. The hub 10 in this variant has a single flange 18 formed in an integral way with the tubular body 12. At the opposite end, the shell 14 is fixed to a metal element 40, made of aluminium or of an aluminium alloy, having a flange 42 provided with holes 44 which receive the ends 24 of the spokes 22 without interposition of the bushings 26. The element 40 is provided with seats for the bearing 16 and for a free-wheel device 46.

What is claimed is:

1. A wheel hub comprising a tubular body having at its ends a pair of flanges, each of which is provided with a plurality of holes for connecting the anchoring portion of a spoke to the hub, characterized in that at least one of said flanges is made of fiber-reinforced plastic material, each of said holes having a metallic bushing fixed therein, each of said bushings having a cylindrical body with a length which is equal to the depth of said hole, and each bushing being set between the anchoring portion of the spoke and the inner wall of the respective hole.

2. The wheel hub according to claim 1, characterized in that each of said bushings (26) has a pair of edges (28) set along opposite radial walls of the respective flange (18).

3. The wheel hub according to claim 1, characterized in that each of said bushings (26) has a single edge (30) set in a position corresponding to the head (32) of a respective spoke (22).

4. The wheel hub recited in claim 1, characterized in that it comprises two flanges made of fiber-reinforced plastic material, the said two flanges being formed in an integral way with a central portion of the hub.

5. The wheel hub recited in claim 1, characterized in that it comprises a first flange made of fiber-reinforced plastic material and formed in an integral way with the aforesaid body, and a second flange made of metal material and fixed to one end of said body.

6. The wheel hub according to claim 5, characterized in that the aforesaid second flange (42) is formed on a metal element (40) provided with seats for a bearing (16) and for a free-wheel device (46).

7. A wheel hub comprising a tubular body (10) having at its ends a pair of flanges, each of which is provided with a plurality of holes for anchorage of respective spokes, characterized in that at least one of said flanges is made of fiber-reinforced plastic material, the holes of said flange being associated to respective bushings made of metal material, each of which, in use, is set between the anchoring portion of a spoke and the inner wall of the respective hole, and characterized in that each of said bushings has a pair of edges set along opposite radial walls of the respective flange.

8. The wheel hub recited in claim 7, characterized in that it comprises two flanges made of fiber-reinforced plastic material, the said two flanges being formed in an integral way with a central portion of the hub.

9. The wheel hub recited in claim 7, characterized in that it comprises a first flange made of fiber-reinforced plastic material and formed in an integral way with the aforesaid body, and a second flange made of metal material and fixed to one end of said body.

10. The wheel hub recited in claim 7, characterized in that said second flange is formed on a metal element provided with seats for a bearing and for a free-wheel device.

11. A wheel hub comprising a tubular body having at its ends a pair of flanges, each of which is provided with a plurality of holes for anchorage of respective spokes, characterized in that at least one of said flanges is made of fiber reinforced plastic material, the holes of said flange being associated to respective bushings made of metal material, each of which, in use, is set between the anchoring portion of a spoke and the inner wall of the respective hole, characterized in that it comprises a first flange made of fiber-reinforced plastic material and formed in an integral way with the aforesaid body, and a second flange made of metal material and fixed to one end of said body.

12. The wheel hub recited in claim 11, characterized in that each of said bushings has a single edge set in a position corresponding to the head of a respective spoke.

13. The wheel hub recited in claim 11, characterized in that it comprises two flanges made of fiber-reinforced plastic material, the said two flanges being formed in an integral way with a central portion of the hub.

14. A wheel hub comprising a tubular body having at its ends a pair of flanges, each of which is provided with a plurality of holes for anchorage of respective spokes, characterized in that at least one of said flanges is made of fiber-reinforced plastic material, the holes of said flange being associated to respective bushings made of metal material, each of which, in use, is set between the anchoring portion of a spoke and the inner wall of the respective hole, characterized in that it comprises a first flange made of fiber-reinforced plastic material and formed in an integral way with the aforesaid body, and a second flange made of metal material and fixed to one end of said body, said second flange being formed on a metal element with seats for a bearing and for a free-wheel device.

15. The wheel hub recited in claim 14, characterized in that each of said bushings has a single edge set in a position corresponding to the head of a respective spoke.

16. The wheel hub recited in claim 14, characterized in that each of said bushings has a single edge set in a position corresponding to the head of a respective spoke.

17. A wheel hub for use on a bicycle, comprising:
   a) a hub body having a tubular central portion and an outwardly-tapering, shoulder portion integrally formed at each end, each shoulder having an opposed free open end;
   b) a first radially-extending flange integrally formed on the free end of a first shoulder portion, said hub body and said flange being made of a fiber-reinforced plastic material;
   c) an annular bearing seat extending axially-inwardly from the open end of said first shoulder portion to a point intermediate said shoulder portion, at least a portion of said bearing seat being located at the same axial distance as said flange so that a radial load applied to said flange is supported by a bearing mounted in said seat;
   d) a plurality of axially-extending spoke anchoring apertures in said flange; and,
   e) a metallic, reinforcement bushing fixed in each of said anchoring apertures.

18. The wheel hub recited in claim 17, including a second radially-extending hub flange integrally formed on the free end of the second shoulder, said hub body and said first and second hub flanges being made of a fiber-reinforced plastic material, and an annular bearing seat extending axially-inwardly from the open end of said second shoulder portion to a point intermediate said shoulder portion, at least a portion of said bearing seat being located at the same axial distance as said second hub flange so that a radial load applied to said second hub flange is directly supported by a bearing mounted in said bearing seat.

19. The wheel hub recited in claim 17, each of said metallic reinforcement bushings having a cylindrical body portion with a length which is equal to the depth of said spoke anchoring apertures.

20. The wheel hub recited in claim 19, each of said bushings having at least one flanged end located on the axially-inward side of said hub flange.

21. The wheel hub recited in claim 17, including an annular flange seat extending axially-inwardly from the open end of the second shoulder portion to a point intermediate said second shoulder portion, and a radially-extending, metallic hub flange mounted in said flange seat.

22. The wheel hub recited in claim 21, said second hub flange including an annular bearing seat extending axially-inwardly from the axial-end of said hub flange to a point intermediate said hub flange, at least a portion of said bearing seat being located at the same axial distance as said flange so that a radial load applied to said second hub flange is supported by a bearing mounted in said seat.

23. A wheel hub comprising a tubular body having at its ends a pair of flanges, each of which is provided with a plurality of holes for connecting the anchoring portion of a spoke to the hub, the hub characterized by:
   at least one of said flanges being on a of fiber-reinforced plastic material, with a metallic bushing in each of said holes, each of said bushings having a cylindrical body portion that fits within the hole and an edge that abuts the flange and limits the distance the body portion is insert into the hole.

24. The wheel hub of claim 23, further characterized by the pair of flanges being of a fiber-reinforced plastic material.

25. The wheel hub of claim 24 further characterized by the body and pair of flanges being a monolithic structure.

26. A wheel hub for anchoring a desired plurality of spokes in a wheel assembly, the hub comprising:
   a monolithic fibre-reinforced plastic structure having a tubular body with a pair of end flanges, each of which is provided with a plurality of apertures that define spoke anchoring positions in the flange; and,
   a plurality of metallic bushing, equal in number to the plurality of spokes, each bushing having a hollow cylindrical body portion that is received within a flange aperture, an edge that abuts the flange and limits the distance the body portion is insert into the aperture and the hollow in the body portion is dimensioned to receive the spoke.

27. The hub of claim 26 wherein each metallic bushing has two edges abutting the flange with the flange disposed in between them.

* * * * *

UNITED STATES PATENT AND TRADEMARK OFFICE
CERTIFICATE OF CORRECTION

PATENT NO.   : 6,568,767 B2
DATED        : May 27, 2003
INVENTOR(S)  : Mario Meggiolan It is certified that error appears in the above-identified patent and that said Letters Patent is hereby corrected as shown below:

<u>Column 4,</u>
Line 40, after the word "being", delete "on a".
Line 45, delete the word "insert", and insert therefor -- inserted -- .
Line 60, after the word "is", delete the word "insert" and insert therefor -- inserted --.

Signed and Sealed this

Ninth Day of September, 2003

JAMES E. ROGAN
*Director of the United States Patent and Trademark Office*